United States Patent
Lynch et al.

(10) Patent No.: US 8,130,916 B2
(45) Date of Patent: Mar. 6, 2012

(54) DYNAMICALLY IMPROVING PERFORMANCE OF AN INTERACTIVE VOICE RESPONSE (IVR) SYSTEM USING A COMPLEX EVENTS PROCESSOR (CEP)

(75) Inventors: Edward M. Lynch, Toronto (CA); David D. Martin, Acton, MA (US); Jared M. Michalec, Denver, CO (US); Victor S. Moore, Lake City, FL (US); Wendi L. Nusbickel, Boca Raton, FL (US)

(73) Assignee: International Business Machines Corporation, Armonk, NY (US)

( * ) Notice: Subject to any disclaimer, the term of this patent is extended or adjusted under 35 U.S.C. 154(b) by 645 days.

(21) Appl. No.: 12/349,725

(22) Filed: Jan. 7, 2009

(65) Prior Publication Data
US 2010/0172479 A1 Jul. 8, 2010

(51) Int. Cl.
*H04M 1/64* (2006.01)

(52) U.S. Cl. ............. 379/88.04; 704/246; 704/270

(58) Field of Classification Search .......... 704/246, 704/270; 379/88.04
See application file for complete search history.

(56) References Cited

U.S. PATENT DOCUMENTS

| | | | |
|---|---|---|---|
| 6,366,879 B1 * | 4/2002 | Coxhead et al. | 704/201 |
| 7,039,136 B2 * | 5/2006 | Olson et al. | 375/346 |
| 7,580,840 B1 * | 8/2009 | Bhasin et al. | 704/270.1 |
| 2008/0304632 A1 * | 12/2008 | Catlin et al. | 379/88.04 |

* cited by examiner

*Primary Examiner* — Creighton Smith
(74) *Attorney, Agent, or Firm* — Patents on Demand P.A.; Brian K. Buchheit; Scott M. Garrett

(57) ABSTRACT

Problematic event data for problematic events that occur during interaction between an Interactive Voice Response (IVR) system and a caller can be captured. The problematic event data can be analyzed for performance issues. A performance issue can represent an interactive segment of the IVR system operating at an unacceptable performance level. An IVR performance improvement action can then be determined to resolve the performance issue. The IVR performance improvement action can be conveyed to the IVR system. Execution of the IVR performance improvement action by the IVR system can reduce occurrences of the problematic events associated with the performance issue.

17 Claims, 3 Drawing Sheets

DYNAMICALLY IMPROVING PERFORMANCE OF AN INTERACTIVE VOICE RESPONSE (IVR) SYSTEM USING A COMPLEX EVENTS PROCESSOR (CEP)

BACKGROUND

The present invention relates to the field of interactive voice response (IVR) systems and, more particularly, to dynamically adjusting the performance of an IVR system using a complex events processor (CEP).

Interactive Voice Response (IVR) systems are an efficient tool used to direct incoming phone sessions to the desired person or information. The usability of IVR systems is typically tested for general functionality with a homogenized caller base. However, actual callers interacting with the IVR system span a variety of language comprehension capabilities and/or linguistic differences. For example, American callers with a Southern accent can have problems understanding an IVR system using synthesized speech with a Mid-Western United States accent.

Conventional IVR systems lack the intelligence to recognize when a caller is experiencing an interaction difficulty or a problematic event occurs. That is, the IVR system cannot recognize that a specific pattern of caller-entered commands can indicate a problematic event experienced by a caller due to the lack of errors generated during the execution of the software. However, when a specific pattern of caller-entered commands is found to be repeated by various, unrelated callers, it can indicate a performance issue of IVR system.

For example, a main menu may include two commands, B and D, that sound similar but provide unrelated call navigation. Callers often select the incorrect command first due to the audible similarity of the commands. Each menu selection made by the caller is valid, and, therefore, does not trigger an operational error within the IVR system. However, by examining the frequency of the patterns "B, back to main, D" and "D, back to main, B", it can be concluded that usability of the main menu can be increased, and caller frustration decreased, by selecting an alternate wording for one of the menu commands.

Current approaches to identify the occurrence of problematic events involve post-processing of all the data collected by the IVR system and additional correlation analysis. Due to their labor-intensive nature, these approaches are typically performed in batches, which decreases the timeliness in which the performance issues are identified and resolved.

BRIEF SUMMARY

One aspect of the present invention can include a method for dynamically improving the performance of an Interactive Voice Response (IVR) system using a complex events processor (CEP) to analyze user-experienced problematic events. Such a method can begin by capturing problematic event data for problematic events that occur during interaction between an Interactive Voice Response (IVR) system and a caller. The problematic event data can be analyzed for performance issues. A performance issue can represent an interactive segment of the IVR system operating at an unacceptable performance level. An IVR performance improvement action can then be determined to resolve the performance issue. The IVR performance improvement action can be conveyed to the IVR system. Execution of the IVR performance improvement action by the IVR system can reduce occurrences of the problematic events associated with the performance issue.

Another aspect of the present invention can include a system that dynamically improves the performance of an Interactive Voice Response (IVR) system using a complex events processor (CEP) to analyze user-experienced problematic events. Such a system can include an IVR system and an IVR performance manager. The IVR system can be configured to interact with the voice communications apparatus of a caller. The IVR performance manager can be configured to automatically and dynamically adjust operation of the IVR system based on the analysis of problematic event data for problematic events detected during interaction between the IVR system and the caller.

Yet another aspect of the present invention can include a computer program product that dynamically improves the performance of an Interactive Voice Response (IVR) system using a complex events processor (CEP) to analyze user-experienced problematic events. The computer program product can include a computer usable medium containing embedded computer usable program code. The computer usable program code can be configured to capture problematic event data for problematic events that occur during the interaction between an Interactive Voice Response (IVR) system and a caller. The computer usable program code can be configured to collectively store the problematic event data in a repository. The computer usable program code can be configured to analyze the problematic event data for performance issues. A performance issue can represent an interactive segment of the IVR system operating at an unacceptable performance level. The computer usable program code can also be configured to determine an IVR performance improvement action to resolve the performance issue. The computer usable program code can then be configured to convey the IVR performance improvement action to the IVR system. Execution of the IVR performance improvement action by the IVR system can reduce the occurrence of problematic events associated with the performance issue.

DETAILED DESCRIPTION

Figure 1:
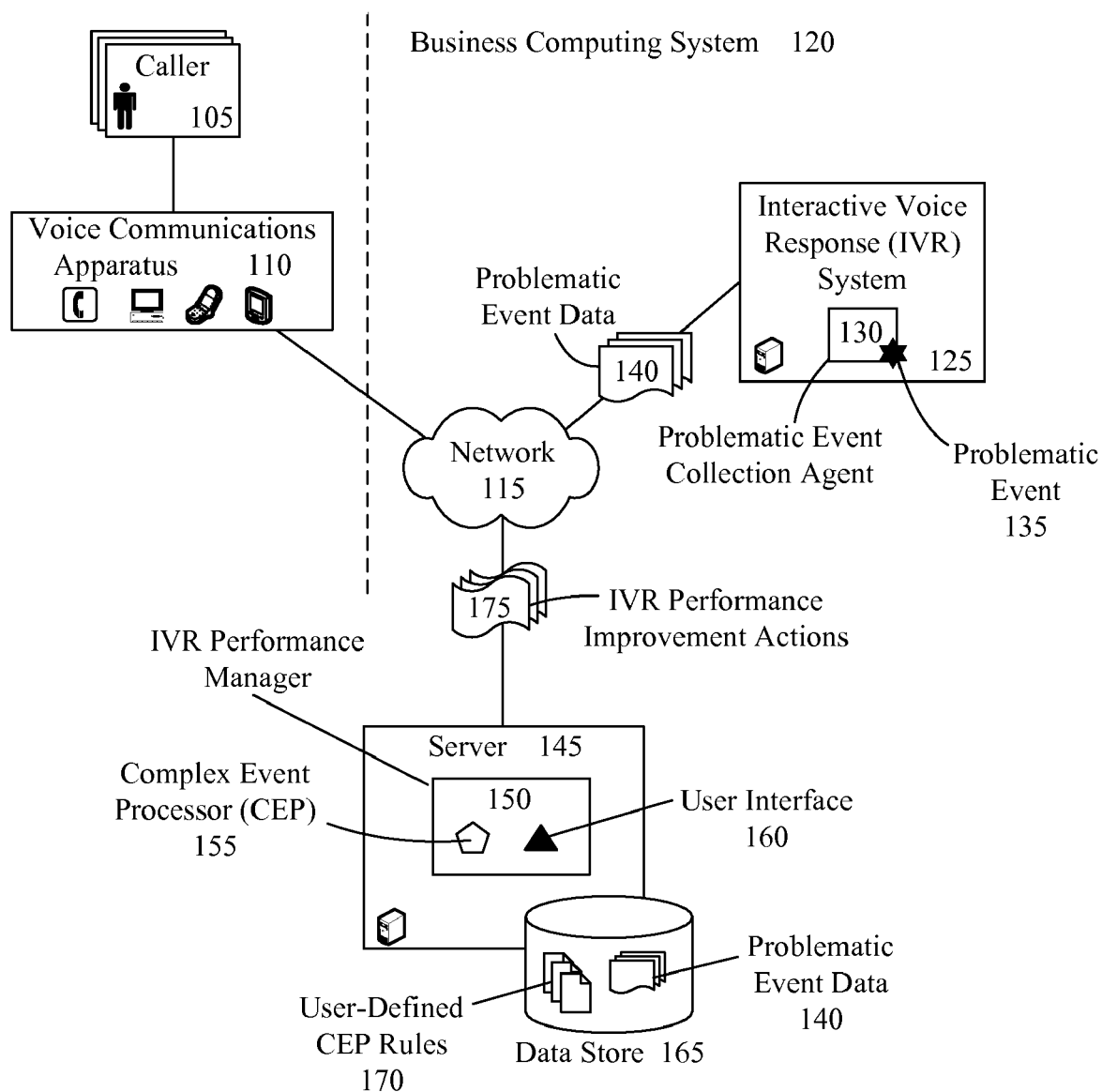
FIG. 1 is a schematic diagram illustrating a system that utilizes a complex events processor (CEP) to dynamically improve the performance of an Interactive Voice Response (IVR) system in accordance with embodiments of the inventive arrangements disclosed herein.

The present invention discloses a solution that can dynamically improve the performance of an Interactive Voice Response (IVR) system using a complex events processor (CEP). During the interaction between the IVR system and a caller, the occurrence of a problematic event can be detected and problematic event data can be captured. A CEP can be used to analyze the problematic event data to identify a performance issue of the IVR system. Identification of a performance issue can result in the CEP determining an appropriate IVR performance adjustment action for the IVR system. Performance of the IVR system can then be dynamically improved by the execution of the IVR performance adjustment action.

The present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. Examples of a computer-readable medium include a semiconductor or solid state memory, magnetic tape, a removable computer diskette, a random access memory (RAM), a read-only memory (ROM), an erasable programmable read-only memory (EPROM or Flash memory, a rigid magnetic disk and an optical disk. Current examples of optical disks include compact disk-read only memory (CD-ROM), compact disk-read/write (CD-R/W) and DVD. Other computer-readable medium can include a transmission media, such as those supporting the Internet, an intranet, a personal area network (PAN), or a magnetic storage device. Transmission media can include an electrical connection having one or more wires, an optical fiber, an optical storage device, and a defined segment of the electromagnet spectrum through which digitally encoded content is wirelessly conveyed using a carrier wave.

Note that the computer-usable or computer-readable medium can even include paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages.

The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

FIG. 1 is a schematic diagram illustrating a system 100 that utilizes a complex events processor (CEP) 155 to dynamically improve the performance of an Interactive Voice Response (IVR) system 125 in accordance with embodiments of the inventive arrangements disclosed herein. In system 100, the IVR performance manager 150 can analyze problematic event data 140 captured by the problematic event collection agent 130 to determine the necessity for modifying the operation of the IVR system 125 to improve performance.

A caller 105 can utilize a voice communications apparatus 110 to interact with the IVR system 125 of the business computing system 120 over a network 115. The voice communications apparatus 110 can represent a variety of hardware and/or software components that can be configured to exchange verbally synthesized communications over the network 115. Examples of a voice communications apparatus 110 can include, but are not limited to, a telephone, a mobile phone, a personal data assistant (PDA), a personal computer running a software telephone application, a Voice over Internet Protocol (VoIP) enabled telephone, and the like.

The IVR system 125 can represent a computing system configured to allow the caller 105 to interact with elements of the business computing system 120, such as an enterprise telephone system (not shown) or automated information database (not shown). An IVR system 125 can include a variety of hardware and software components that enable this functionality.

During the caller's 105 interaction with the IVR system 125, the problematic event collection agent 130 can detect the occurrence of a variety of problematic events 135. The problematic event collection agent 130 can represent a software application configured to provide real-time detection of problematic events 135 and capture the associated problematic event data 140.

In another embodiment, the problematic event collection agent 130 can be an integrated component and/or functionality of the CEP 155. For example, the CEP 155 can receive a stream of data, called an event stream, from the IVR system 125. The CEP 155 can then process the event stream to determine the occurrence of problematic events 135 and can extract the problematic event data 140 from the event stream.

As used herein, the term "problematic event" is used to refer to occurrence of one or more user-defined conditions that can represent potential hindrances to the performance of the IVR system 125. It is crucial to emphasize that a problematic event 135 is not equivalent to an error generated by the IVR system 125.

A problematic event 135 can correspond to one or more actions performed by the caller 105 that can be of interest for the purposes of improving the performance of the IVR system 125. Examples of a problematic event 135 can include, but are not limited to, a specific sequence of menu commands selected by the caller 105, the premature termination of the call, repetition of a menu, and the like.

The problematic event data 140 can correspond to data elements pertaining to the call and/or caller 105 that are available from the IVR system 125. Examples of problematic event data 140 can include, but are not limited to, a call identifier, a phone number, a problematic event identifier, the location within the phone tree where the problematic event 135 was detected, the type of communication connection, and the like.

The captured problematic event data 140 can be sent over the network 115 to a server 145 of the business computing system 120 hosting the IVR performance manager 150. Additionally, the server 145 can include a data store 165 containing user-defined CEP rules 170 and the received problematic event data 140.

In another contemplated embodiment, the IVR performance manager 150 and data store 165 can reside within the IVR system 125. As such, the IVR performance manager 150 would operate from a suitable component of the IVR system 125.

In an alternate embodiment, the data store 165 can be located remotely from, but can be accessible by, the server 145.

The IVR performance manager 150 can represent a software application configured to determine if analysis of the collected problematic event data 140 indicates a performance issue of the IVR system 125. The IVR performance manager 150 can include a complex events processor (CEP) 155 and a user interface 160.

A CEP 155 can represent a software application capable of providing real-time data correlation with respect to predefined patterns or contexts and executing predetermined actions in response to pattern detections. Operation of the CEP 155 can be governed by a set of user-defined CEP rules 170. That is, the user-defined CEP rules 170 can be used to define performance issues and the IVR performance improvement actions 175 to resolve the identified performance issues. The user-defined CEP rules 170 can also include the definition of problematic events 135.

When analysis of the problematic event data 140 by the CEP 155 indicates a performance deficiency within the IVR system 125, the CEP 155 can determine an appropriate IVR performance improvement action 175 to resolve the performance issue. The IVR performance improvement action 175 can represent a set of instructions that can be used to modify operation of the IVR system 125. Instructions contained within the IVR performance improvement action 175 can be require manual and/or automated execution.

The user interface 160 can represent an interface mechanism that can allow an administrator (not shown) of the business computing system 120 to configure the operation of the IVR performance manager 150 and/or CEP 155. Using the user interface 160, the administrator can define/modify CEP rules 170, make selections for configurable options, review/execute IVR performance improvement actions 175, and the like.

It should be emphasized that the cyclic process of detecting and resolving the performance issues of the IVR system 125 is dynamic and user-driven. The user-defined CEP rules 170 can be created by various individuals/departments of the organization to examine the performance of the IVR system 125 from a variety of perspectives simultaneously.

Further, the IVR performance improvement actions 175 issued by the CEP 155 can have an immediate impact on the operation of the IVR system 125, propagating an immediate change in the problematic events 135 that occur. This leads to the detection of different performance issues and the continued improvement of the IVR system 125.

As used herein, presented data stores, including store 155, can be a physical or virtual storage space configured to store digital information. Data store 155 can be physically implemented within any type of hardware including, but not limited to, a magnetic disk, an optical disk, a semiconductor memory, a digitally encoded plastic memory, a holographic memory, or any other recording medium. Data store 155 can be a stand-alone storage unit as well as a storage unit formed from a plurality of physical devices. Additionally, information can be stored within data store 155 in a variety of manners. For example, information can be stored within a database structure or can be stored within one or more files of a file storage system, where each file may or may not be indexed for information searching purposes. Further, data store 155 can utilize one or more encryption mechanisms to protect stored information from unauthorized access.

Network 115 can include any hardware/software/and firmware necessary to convey data encoded within carrier waves. Data can be contained within analog or digital signals and conveyed though data or voice channels. Network 115 can include local components and data pathways necessary for communications to be exchanged among computing device components and between integrated device components and peripheral devices. Network 115 can also include network equipment, such as routers, data lines, hubs, and intermediary servers which together form a data network, such as the Internet. Network 115 can also include circuit-based communication components and mobile communication components, such as telephony switches, modems, cellular communication towers, and the like. Network 115 can include line based and/or wireless communication pathways.

Figure 2:
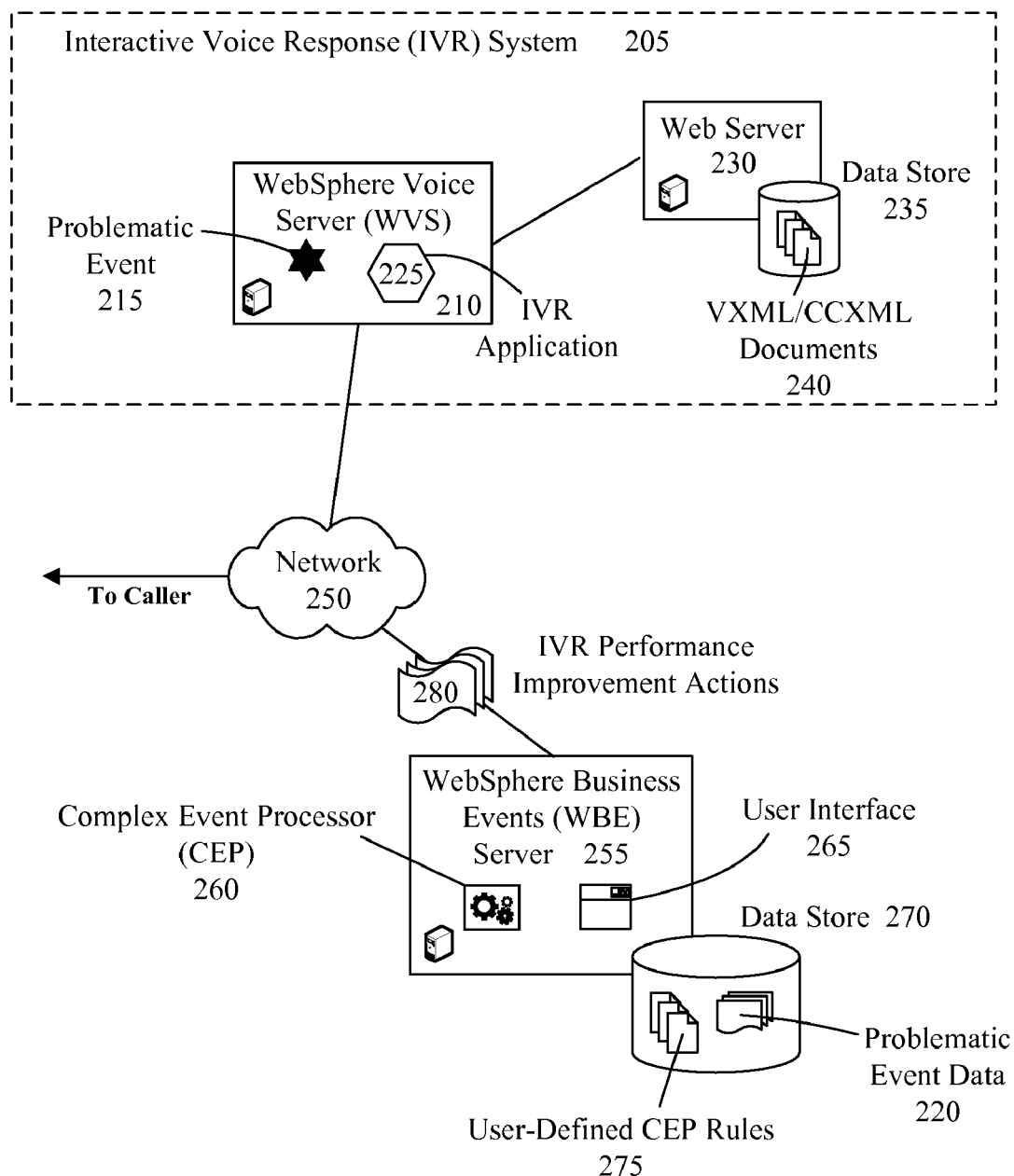
FIG. 2 is a schematic diagram illustrating a system that utilizes a WEBSPHERE BUSINESS EVENTS (WBE) server to dynamically improve the performance of an Interactive Voice Response (IVR) system in accordance with an embodiment of the inventive arrangements disclosed herein.

FIG. 2 is a schematic diagram illustrating a system 200 that utilizes a WEBSPHERE BUSINESS EVENTS (WBE) server 255 to dynamically improve the performance of an Interactive Voice Response (IVR) system 205 in accordance with embodiments of the inventive arrangements disclosed herein. System 200 can represent a specific embodiment of system 100.

In system 200, the WBE server 255 can fulfill the functionality of the IVR performance manager 150 and problematic event collection agent 130 of system 100. The WBE server 255 can include a CEP 260, a user interface 270, and a data store 270 containing problematic event data 220 and the user-defined CEP rules 275.

The WBE server 255 can monitor an event stream of data from the IVR system 205 over the network 250 to detect the occurrence of problematic events 215. When a problematic event 215 is detected, problematic event data 220 can be extracted from the event stream and stored in the data store 270 for analysis.

The CEP 260 can utilize the user-defined CEP rules 275 to analyze the problematic event data 220 to determine the existence of performance issues in the current operation of the IVR system 220. The CEP 260 can ascertain the proper IVR performance improvement action 280 to resolve identified performance issues.

The user interface 265 can be used to configure operation of the WBE server 255 and/or CEP 260. Configuration of the CEP 260 can include the creation/modification of user-defined CEP rules 275.

Additionally, the user interface 260 can be used to gather the necessary user input for IVR performance improvement actions 280. For example, an IVR performance improvement action 280 may require a rewording of a menu command. IVR performance improvement actions 280 that involve a change in text can be denoted as requiring user input of the new text. As such, the user interface 260 can be configured to support this type of request for user input.

The determined IVR performance improvement action 280 can be conveyed by the WBE server 255 over the network 250 to the IVR system 205. The IVR system 205 can include a WEBSPHERE VOICE SERVER (WVS) 210 and a Web server 230. The WVS 210 can provide all of the necessary components, such as a text-to-speech (TTS) engine and speech grammars, for the operation of the IVR application 225.

The IVR application 225 can be a software program configured to provide predetermined voice prompts in response to received input from a caller. Execution of the IVR application 225 can utilize Voice Extensible Markup Language (VXML) and/or Call Control Extensible Markup Language (CCXML) documents 240. VXML/CCXML documents 240 can be modified by an IVR performance improvement action 280.

As shown in this example, the VXML/CCXML documents 240 can be contained within the data store 235 of a Web server 230. In an alternate embodiment, the data store 235 containing the VXML/CCXML documents 240 can be local to the WVS 210.

As used herein, presented data stores, including stores 235 and 270, can be a physical or virtual storage space configured to store digital information. Data stores 235 and 270 can be physically implemented within any type of hardware including, but not limited to, a magnetic disk, an optical disk, a semiconductor memory, a digitally encoded plastic memory, a holographic memory, or any other recording medium. Data stores 235 and 270 can be a stand-alone storage unit as well as a storage unit formed from a plurality of physical devices. Additionally, information can be stored within data stores 235 and 270 in a variety of manners. For example, information can be stored within a database structure or can be stored within one or more files of a file storage system, where each file may or may not be indexed for information searching purposes. Further, data stores 235 and/or 270 can utilize one or more encryption mechanisms to protect stored information from unauthorized access.

Network 250 can include any hardware/software/and firmware necessary to convey data encoded within carrier waves. Data can be contained within analog or digital signals and conveyed though data or voice channels. Network 250 can include local components and data pathways necessary for communications to be exchanged among computing device components and between integrated device components and peripheral devices. Network 250 can also include network equipment, such as routers, data lines, hubs, and intermediary servers which together form a data network, such as the Internet. Network 250 can also include circuit-based communication components and mobile communication components, such as telephony switches, modems, cellular communication towers, and the like. Network 250 can include line based and/or wireless communication pathways.

Figure 3:
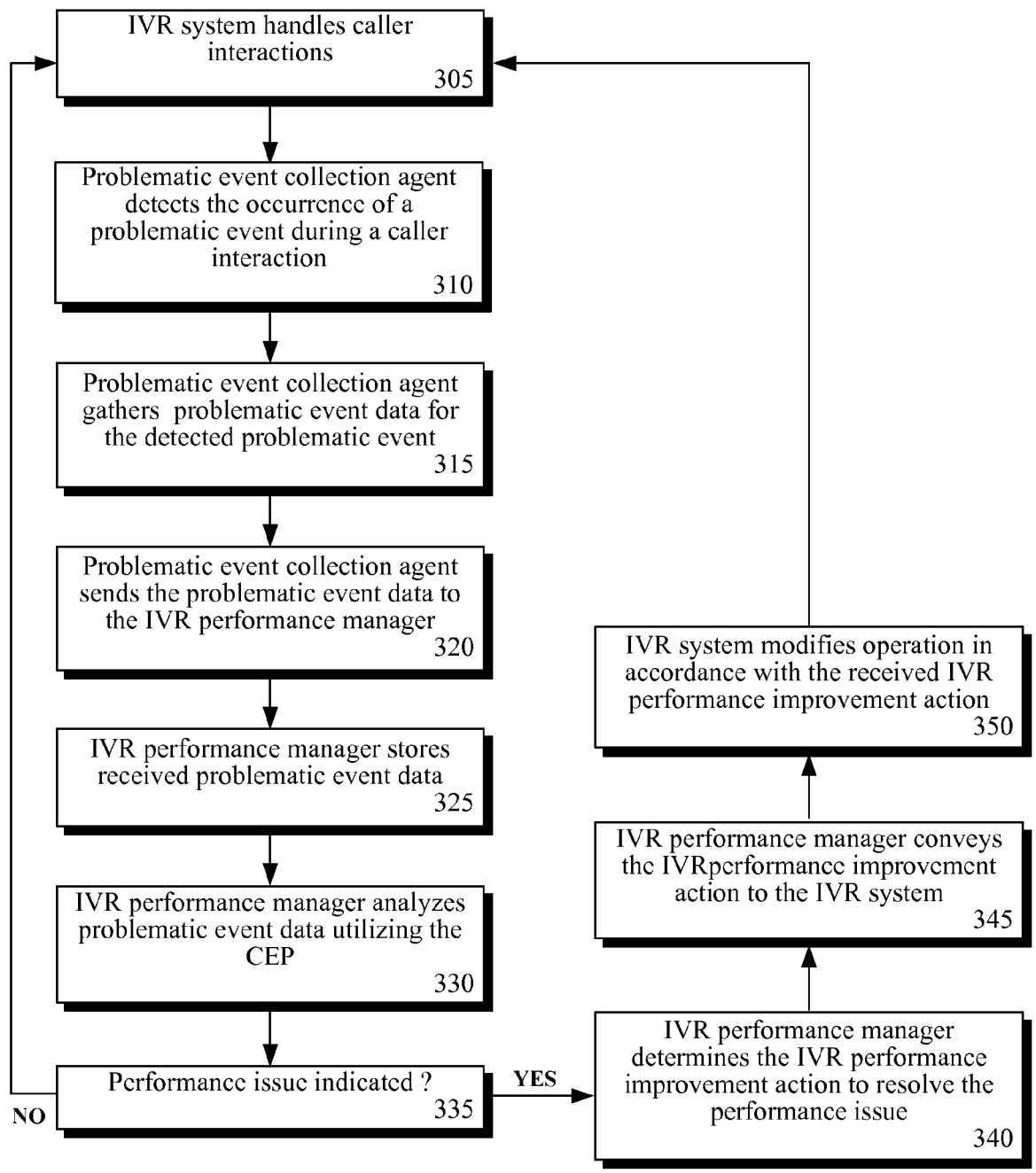
FIG. 3 is a flow chart of a method detailing the use of a complex events processor (CEP) to dynamically improve the performance of an Interactive Voice Response (IVR) system in accordance with an embodiment of the inventive arrangements disclosed herein.

FIG. 3 is a flow chart of a method 300 detailing the use of a complex events processor (CEP) to dynamically improve the performance of an Interactive Voice Response (IVR) system in accordance with an embodiment of the inventive arrangements disclosed herein. Method 300 can be performed in the context of systems 100 or 200.

Method 300 can begin with step 305 where the IVR system can handle caller interactions. In step 310, the problematic event collection agent can detect the occurrence of a problematic event during a caller interaction. Problematic event data can be captured for the detected problematic event by the problematic event collection agent in step 315.

In step 320, the problematic event collection agent can send the captured problematic event data to the IVR performance manager. The IVR performance manager can store the received problematic event data in step 325. In step 330, the IVR performance manager can utilize a CEP to analyze the problematic event data.

In step 335, it can be determined if the analysis of the problematic event data indicates a performance issue. When a performance issue is not indicated, flow can return to step 305 where more caller interactions occur with the IVR system.

When a performance issue is indicated, step 340 can execute where the IVR performance manager can determine the IVR performance improvement action to resolve the performance issue. The IVR performance manager can convey the IVR performance improvement action to the IVR system in step 345.

In step 350, the IVR system can modify its operation in accordance with the received IVR performance action. From step 350, flow can return to step 305.

It should be noted that the steps 310 through 345 of method 300 can be executed by a WEBSPHERE BUSINESS EVENTS (WBE) server in lieu of the IVR performance manager and problematic event collection agent.

The diagrams in FIGS. 1-3 illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for improving performance of an Interactive Voice Response (IVR) system comprising:
    capturing problematic event data for a plurality of problematic events that occur during interaction between an Interactive Voice Response (IVR) system and a calling entity;
    analyzing the problematic event data for a performance issue;
    determining an IVR performance improvement action to resolve the performance issue; and
    conveying said IVR performance improvement action to the IVR system, wherein an execution of the IVR performance improvement action by the IVR system modifies operation of the IVR system to reduce occurrences of problematic events associated with the performance issue, wherein capturing of the problematic event, analyzing the problematic event data, and determining the IVR performance improvement action are performed in real-time by an IVR performance manager, wherein said IVR performance manager utilizes a Complex Events Processor (CEP) and a plurality of user-created CEP rules.

2. The method of claim 1, further comprising:
    collectively storing the problematic event data in a repository; and
    identifying problematic event data associated with the performance issue within the repository as resolved by the IVR performance improvement action.

3. The method of claim 1, wherein the CEP is provided by a WEBSPHERE BUSINESS EVENT server.

4. The method of claim 1, wherein the plurality of user-defined CEP rules define conditions that signal an occurrence of a problematic event.

5. The method of claim 1, wherein a problematic event comprises at least one of a repetition of a specific menu meeting, a predefined threshold value, an erroneous menu entry, a prematurely-terminated call session, and a request for a human operator.

6. The method of claim 1, wherein the captured problematic event data comprises at least one of a calling entity identifier, a timestamp, a date, an error code, a problem description, and a call tree location.

7. The method of claim 1, wherein the IVR performance adjustment action comprises at least one of associating a grammar to a specified caller group, a modification to a Voice Extensible Markup Language (VXML) document of the IVR system, and a request for user reconciliation of the performance issue.

8. A system for improving the performance of an Interactive Voice Response (IVR) system comprising:
    an Interactive Voice Response (IVR) system configured to communicatively interact with a voice communications apparatus of a calling entity; and
    an IVR performance manager configured to automatically and dynamically adjust operation of the IVR system based on an analysis of problematic event data for problematic events detected during interaction between the IVR system and the calling entity, wherein the IVR performance manager comprises:
        a plurality of complex events processor (CEP) rules defining conditions that signal an occurrence of a problematic event and the analysis of problematic event data;
        a problematic event collection agent configured utilize the plurality of CEP rules to detect the occurrence of the problematic event within the IVR system and capture the problematic event data corresponding to the detected problematic event;
        a complex events processor (CEP) configured to utilize the plurality of CEP rules and the problematic event data to determine a performance issue of the IVR system and provide the IVR system with an IVR performance improvement action to resolve said performance issue; and
        a user interface configured to enable user-creation of the plurality of CEP rules and configuration of the CEP.

9. The system of claim 8, wherein the components of claim 8 are provided by a WEBSPHERE BUSINESS EVENT (WBE) server.

10. The system of claim 8, wherein the IVR performance improvement action comprises at least one of associating a grammar to a specified calling entity, a modification to a Voice Extensible Markup Language (VXML) document of the IVR system, and a request for user reconciliation of the performance issue.

11. The system of claim 8, wherein the problematic event collection agent is an integrated component of the IVR system.

12. The system of claim 8, wherein a problematic event comprises at least one of a repetition of a specific menu meeting a predefined threshold value, an erroneous menu entry, a prematurely-terminated call session, and a request for a human operator.

13. The system of claim 8, wherein the plurality of problematic event data comprises at least one of a calling entity identifier, a timestamp, a date, an error code, a problem description, and a call tree location.

14. A computer program product that improves the performance of an Interactive Voice Response (IVR) system comprising:
   a non-transitory computer readable storage medium having computer usable program code embodied therewith, the computer usable program code comprising:
   computer usable program code configured to capture problematic event data for a plurality of problematic events that occur during interaction between an Interactive Voice Response (IVR) system and a calling entity;
   computer usable program code configured to analyze the problematic event data for a performance issue;
   computer usable program code configured to determine an IVR performance improvement action to resolve the performance issue;
   computer usable program code configured to convey said IVR performance improvement action to the IVR system, wherein an execution of the IVR performance improvement action by the IVR system modifies operation of the IVR system to reduce occurrences of problematic events associated with the performance issue; and
   computer usable program code that captures of the problematic event, analyzes the problematic event data, and determines the IVR performance improvement action is executed in real-time by an IVR performance manager, wherein said IVR performance manager is configured to utilize a Complex Events Processor (CEP) and a plurality of user-created CEP rules.

15. The computer program product of claim 14, further comprising:
   computer usable program code configured to collectively store the problematic event data in a repository; and
   computer usable program code configured to identify problematic event data associated with the performance issue within the repository as resolved by the IVR performance improvement action.

16. The computer program product of claim 14, wherein a problematic event comprises at least one of a repetition of a specific menu meeting a predefined threshold value, an erroneous menu entry, a prematurely-terminated call session, and a request for a human operator.

17. The computer program product of claim 14, wherein the IVR performance adjustment action comprises at least one of associating a grammar to a specified caller group, a modification to a Voice Extensible Markup Language (VXML) document of the IVR system, and a request for user reconciliation of the performance issue.

* * * * *